United States Patent
Kirchberger et al.

(10) Patent No.: US 9,070,311 B2
(45) Date of Patent: Jun. 30, 2015

(54) ILLUMINATION DEVICE WITH RADIATION REFLECTORS ARRANGED MODULARLY TO FORM A RADIATION-REFLECTING LUMINOUS AREA

(75) Inventors: Guenter Kirchberger, Sinzing (DE); Ludwig Ploetz, Arnschwang (DE); Markus Zeiler, Undorf-Nittendorf (DE); Hubert Ott, Bad Abbach (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 276 days.

(21) Appl. No.: 12/525,642

(22) PCT Filed: Feb. 11, 2008

(86) PCT No.: PCT/DE2008/000266
§ 371 (c)(1),
(2), (4) Date: Oct. 23, 2009

(87) PCT Pub. No.: WO2008/098566
PCT Pub. Date: Aug. 21, 2008

(65) Prior Publication Data
US 2010/0033956 A1  Feb. 11, 2010

(30) Foreign Application Priority Data
Feb. 14, 2007  (DE) .......................... 10 2007 007 353

(51) Int. Cl.
*F21V 7/00*  (2006.01)
*G09F 13/14*  (2006.01)
*G02B 5/09*  (2006.01)

(52) U.S. Cl.
CPC .. *G09F 13/14* (2013.01); *G02B 5/09* (2013.01)

(58) Field of Classification Search
CPC ............. G02B 2/09; G09F 13/14; F21V 7/00; F21V 7/0008; F21V 7/0083
USPC ............ 362/241, 245, 247, 249.02, 341–342, 362/346, 800
See application file for complete search history.

(56) References Cited

U.S. PATENT DOCUMENTS

| | | | |
|---|---|---|---|
| 3,754,132 A | 8/1973 | Mamrud et al. | |
| 7,156,539 B2 * | 1/2007 | Cronk | ............................ 362/297 |
| 7,172,325 B2 * | 2/2007 | Kim et al. | ...................... 362/561 |
| 2004/0212998 A1 | 10/2004 | Mohacsi | |
| 2005/0138852 A1 | 6/2005 | Yamauchi | |
| 2005/0265042 A1 | 12/2005 | Kim et al. | |
| 2005/0276069 A1 | 12/2005 | Taniguchi et al. | |

FOREIGN PATENT DOCUMENTS

| | | |
|---|---|---|
| DE | 38 03 951 A1 | 8/1989 |
| DE | 44 35 389 A1 | 4/1996 |
| DE | 295 20 700 U1 | 4/1997 |
| DE | 20 2005 009 086 U1 | 11/2005 |
| EP | 0 328 088 B1 | 5/1994 |
| EP | 1 586 814 A2 | 10/2005 |
| JP | 2004006317 A | 1/2004 |
| JP | 2005321693 A | 11/2005 |
| TW | I260381 B | 8/2006 |

* cited by examiner

*Primary Examiner* — Jason Moon Han
(74) *Attorney, Agent, or Firm* — Slater & Matsil, L.L.P.

(57) ABSTRACT

An illumination device includes a number of radiation reflectors that are each irradiated by at least one light source. The radiation reflectors are shaped in such a way that they can be combined modularly to form a radiation-reflecting luminous area.

29 Claims, 6 Drawing Sheets

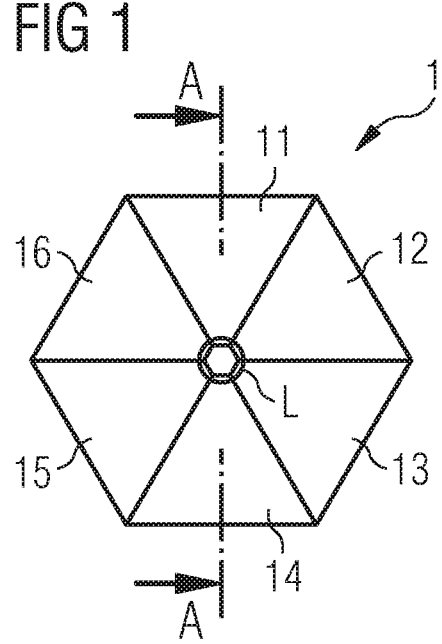
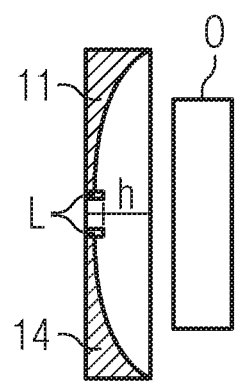

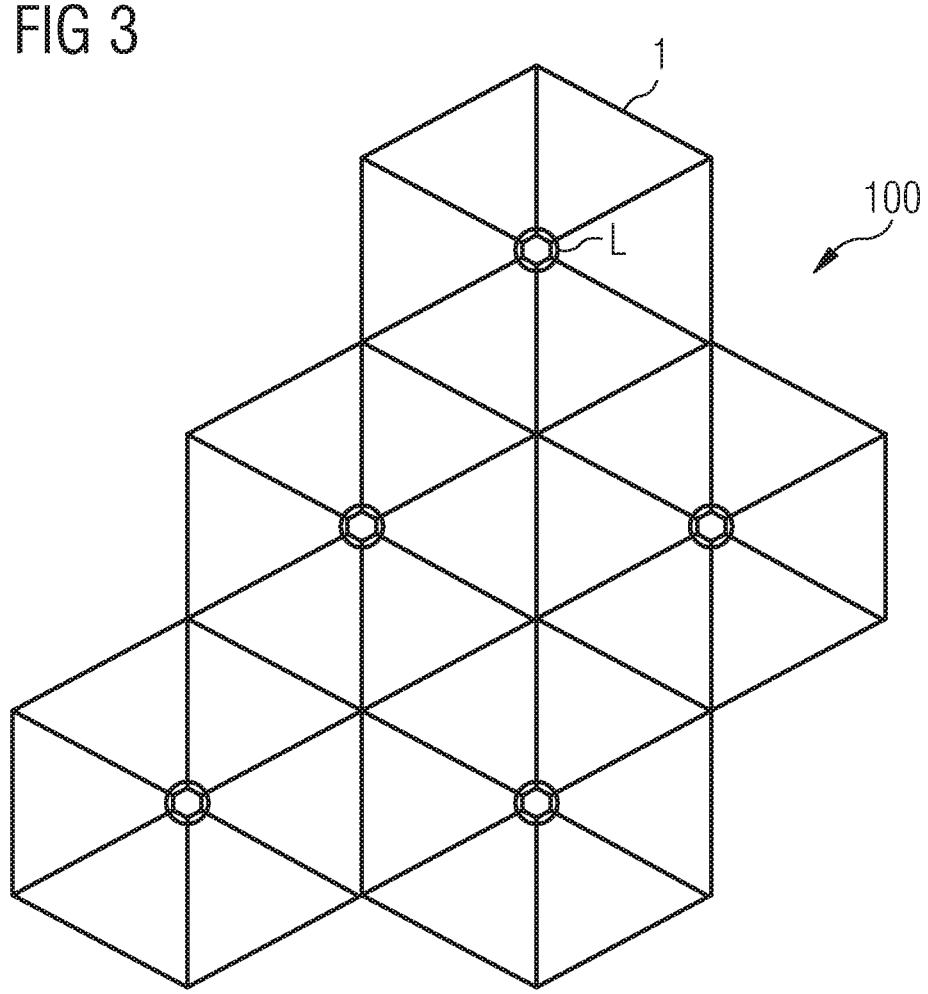

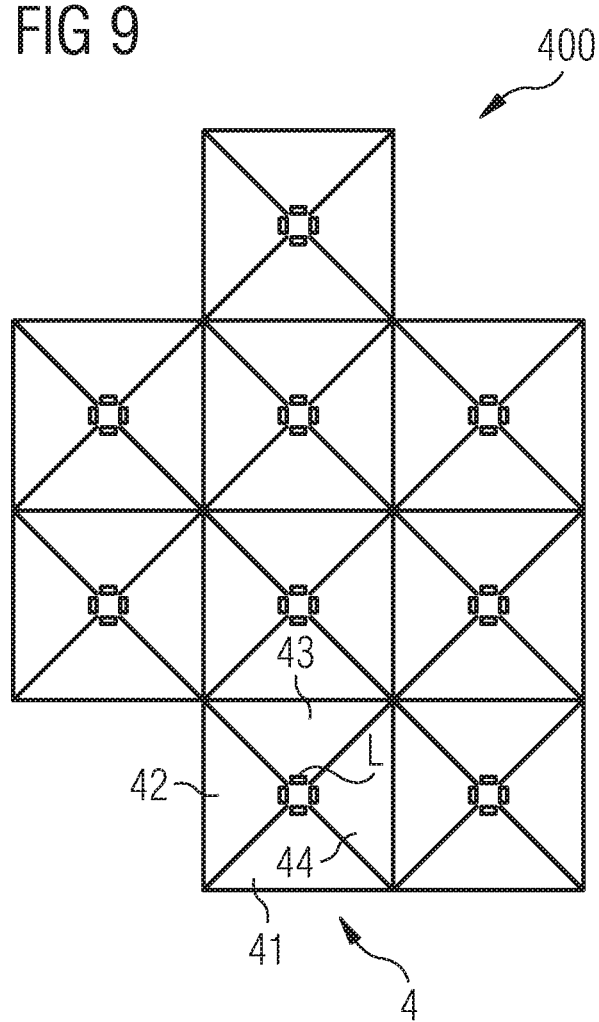

ILLUMINATION DEVICE WITH RADIATION REFLECTORS ARRANGED MODULARLY TO FORM A RADIATION-REFLECTING LUMINOUS AREA

This patent application is a national phase filing under section 371 of PCT/DE2008/000266, filed Feb. 11, 2008, which claims the priority of German patent application 10 2007 007 353.6, filed Feb. 14, 2007, each of which is incorporated herein by reference in its entirety.

TECHNICAL FIELD

The present application relates to an illumination device which can be used in particular as a backlighting unit for small and large areas, for example, for backlighting billboards or for display backlighting.

BACKGROUND

Luminous areas are generally used for backlighting objects, for example, for backlighting billboards. In the case of luminous areas of this type, one or more light sources is or are arranged at a relatively large distance behind the object to be backlit. In order that the light emitted in substantially punctiform fashion by a light source, for example, a light-emitting diode, is distributed over a larger area, a diffusing film is arranged between the object to be backlit and the light source. In order that the light emitted by the light source can be diffused over a sufficiently large area by the diffusing film, the light source is generally arranged at a distance of more than 50 mm before the diffusing film. The actual object to be backlit is arranged once again at a distance from the diffusing film.

Luminous areas having a construction of this type therefore have a high structural height. In order to reduce the structural height, it is possible, for example, to use very bright light sources. Use is made, for example, of light sources using CCFL (cold cathode fluorescent lighting) technology, and also fluorescent lamps or LED backlights. When using such light sources, although the structural height can be reduced somewhat, the object is often backlit in a manner that is no longer uniform. In order to prevent darkened regions of the backlit object from arising, it is necessary to use a multiplicity of light sources arranged at a distance behind the object to be backlit.

SUMMARY

In one aspect, the present invention specifies an illumination device that has a small structural height and can easily be adapted to an object to be backlit.

For example, an illumination device includes a multiplicity of radiation reflectors, which are each irradiated by at least one light source. In this case, the radiation reflectors are shaped in such a way that they can be combined modularly to form a radiation-reflecting luminous area.

The construction of a luminous area from many individual radiation reflectors embodied as luminous tiles, for example, makes it possible to enlarge or reduce the luminous area depending on the object to be illuminated or depending on the object to be backlit. The luminous area is constructed from the radiation reflectors, in particular, using light box technology. In light box technology, display objects, for example, letters of a display panel, which are backlit by the luminous area are arranged at a small distance in front of the luminous area. By virtue of the modular construction of the luminous area, a small number of light sources, for example, a small number of LEDs (light-emitting diodes), is sufficient for illuminating a large area. As a result, the modularly constructed luminous area has a low energy consumption.

In particular, the radiation reflectors of the modularly combined luminous area are components of identical type, in particular, standardized components. Simple and cost-effective production is thus possible. The radiation reflectors are preferably combined without any gaps to form the luminous area.

In one configuration, the radiation reflectors of the illumination device are combined to form the luminous area in such a way that they laterally adjoin one another. As an alternative or in addition, the radiation reflectors can also be arranged in overlapping fashion. By way of example, at least two radiation reflectors overlap laterally. If two radiation reflectors overlap laterally, one of the radiation reflectors covers the other in places in a plan view of the luminous area. By way of example, a partial region of one radiation reflector, in a plan view of the luminous area, covers the light source which irradiates a further radiation reflector.

In one development, the radiation reflectors overlap in imbricated fashion. In the case of a luminous area modularly combined from radiation reflectors overlapping in imbricated fashion, the radiation reflectors are arranged, for example, in successive rows. In particular, the radiation reflectors of one row are covered in places by the radiation reflectors of the preceding row and/or they cover the radiation reflectors of the succeeding row in places.

In one development of the illumination device, the at least one light source is arranged at a respective center of the radiation reflectors. The at least one light source is formed in such a way that light generated by the at least one light source is emitted radially in the direction of the respective radiation reflector. The radiation reflectors are preferably shaped in such a way that light reflected at each of the radiation reflectors is reflected in a direction perpendicular to the direction of the light emitted by the at least one light source.

The arrangement of the light source at the center of the radiation reflectors makes it possible to realize a uniform light distribution. As a result, it is possible to construct luminous areas with a homogeneously illuminated area.

In another embodiment of the illumination device, each of the radiation reflectors has a plurality of radiation-reflecting areas.

In accordance with a further feature of the illumination device, the respective radiation-reflecting areas of the radiation reflectors are arranged in a manner curved outwards from the respective center of the radiation reflectors. In particular, the radiation reflector constitutes a concave mirror.

In accordance with another embodiment of the illumination device, a plurality of light sources are arranged at the respective center of the radiation reflectors, each of the respective radiation-reflecting areas of the radiation reflectors being irradiated by one of the light sources. In particular, each radiation-reflecting area is assigned precisely one light source.

In accordance with a preferred embodiment, the respective radiation-reflecting areas of the radiation reflectors are formed in triangular fashion. In this case, the precise shaping of the radiation-reflecting area can deviate slightly from the exact form of a triangle. By way of example, one vertex of the triangle—in particular the vertex adjacent to the light source—can be truncated.

In one embodiment of the illumination device, a respective opening of the radiation reflectors from which the reflected light emerges is formed in honeycomb-shaped fashion. In a specific form, a respective opening of the radiation reflectors from which the reflected light emerges is formed in hexagonal fashion.

In accordance with a further feature of an illumination device according to the invention, a respective peripheral line of the radiation-reflecting areas of the radiation reflectors is formed as an equilateral triangle.

In accordance with one development of the illumination device according to the invention, the respective radiation-reflecting areas of the radiation reflectors are formed in the form of a circle segment. In this case, the outer circle line can be embodied in round or oval fashion. An example of a circle segment with an outer circle line embodied in oval fashion is an ellipse segment. Preferably, the circle-segment-shaped radiation-reflecting areas of the radiation reflector are combined in such a way that the mutually facing legs of adjacent circle segments coincide. In one development, the radiation reflector is constructed in such a way that a free leg of the first and of the last circle segment respectively remains. The free legs of the first and of the last circle segment are preferably substantially parallel. "Substantially" parallel legs form, in particular, at an angle of between 160° and 200°, preferably between 170° and 190°, with one another, where the boundaries are included in each case.

In this case, the precise shaping of the radiation-reflecting area can deviate slightly from the exact form of a circle segment. By way of example, the vertex of the circle segment opposite the outer circle line can be truncated and/or at least one of the two legs—in particular the free legs of the first and last circle segments—can be embodied in curved fashion.

In another embodiment of the illumination device, each of the radiation reflectors is composed of at least two radiation-reflecting areas.

In accordance with a further feature of one configuration of the illumination device, the radiation reflectors, for forming the luminous area, are arranged in at least two rows that are offset with respect to one another.

One development of the illumination device provides for a respective opening of the radiation reflectors from which the reflected light emerges to be formed in triangular fashion. It is also possible for a respective opening of the radiation reflectors from which the reflected light emerges to be formed in rectangular fashion.

In a specific form of the illumination device, each of the radiation reflectors can be formed in pyramidal fashion.

In accordance with a further feature of one configuration of the illumination device according to the invention, a respective surface of the radiation-reflecting areas of the radiation reflectors is formed in structured fashion.

In accordance with a further embodiment of the illumination device, the respective surface of the radiation-reflecting areas of the radiation reflectors has a groove, step or edge structure.

In accordance with a further feature of one configuration of the illumination device, the at least one light source is formed as a light-emitting diode. In this case, the light-emitting diode can be embodied as a light-emitting diode chip or as a light-emitting diode component which contains a light-emitting diode chip or a plurality of light-emitting diode chips on a chip carrier and/or in a component housing. In a preferred embodiment, the light-emitting diode has a directional emission in the direction of the respective radiation reflector. By way of example, the light-emitting diode is a side emitting light-emitting diode component. Side emitting light-emitting diode components are provided, in particular, for mounting on a carrier such as a circuit board and for emission along a direction parallel to the carrier. The light-emitting diode has, for example, a power consumption of 1 W or more, in particular of 3 W or more. In one development, the light-emitting diode is an RGB LED containing, for example, at least one red-emitting, one green-emitting and one blue-emitting light-emitting diode chip. In another development, the light-emitting diode is a white light LED containing a light-emitting diode chip emitting in the green, blue and/or ultraviolet spectral range and a luminescence conversion element comprising a phosphor.

In a preferred embodiment of the illumination device, the radiation reflectors are combined to form the radiation-reflecting luminous area by means of connecting elements, in particular, by means of brackets.

Preferably, an illumination device according to one of the embodiments mentioned is used for backlighting objects, in particular, for backlighting display panels, billboards, or for backlighting displays. In this case, a distance between an object to be backlit and the illumination device is preferably 50 mm or less, particularly preferably between 10 mm and 15 mm, the limits being included. In one configuration, the illumination device is contained in a backlighting apparatus for a display panel such as a billboard or for a display. The backlighting apparatus has, for example, a structural height of 50 mm or less, for example, between 10 mm and 15 mm, the limits being included. In one development, the backlighting apparatus is free of a diffuser element, such as a diffusing film, disposed downstream of the radiation reflectors.

BRIEF DESCRIPTION OF THE DRAWINGS

The illumination device is explained in more detail below with reference to figures showing exemplary embodiments of the illumination device. In the figures:

FIG. 1 shows an embodiment of a radiation reflector for generating radiation,

FIG. 2 shows a cross section through an embodiment of a radiation reflector for generating radiation, FIG. 3 shows an embodiment of a luminous area with a multiplicity of radiation reflectors, FIG. 9 shows an embodiment of a luminous area for generating radiation.

DETAILED DESCRIPTION OF ILLUSTRATIVE EMBODIMENTS

Figure 4:
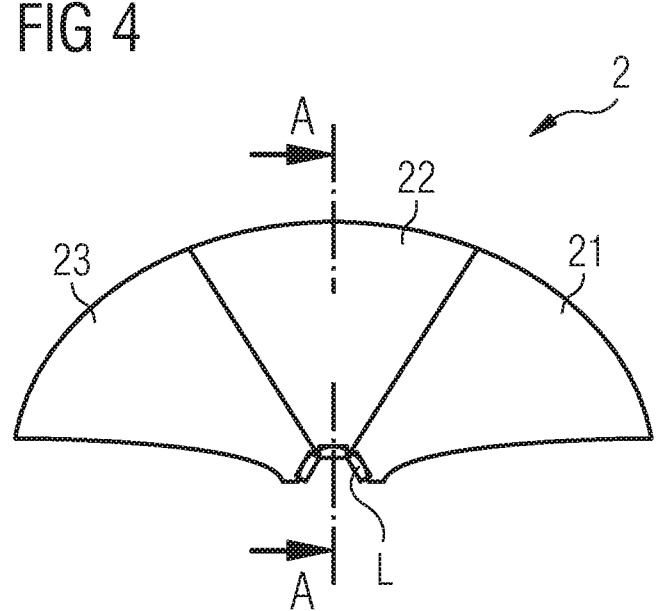
FIG. 4 shows an embodiment of a radiation reflector for generating radiation.

FIG. 1 shows an embodiment of a radiation reflector 1 having a plurality of radiation-reflecting areas 11, 12, 13, 14, 15, 16. A plurality of light sources L, for example, light-emitting diodes, are arranged at the center of the radiation reflector. In this case, the light sources are arranged in such a way that each radiation-reflecting area is assigned precisely one light source. The radiation-reflecting areas are formed in triangular fashion. In the case of the arrangement of the triangular radiation-reflecting areas which are shown in FIG. 1, this results in a radiation reflector having a honeycomb-shaped emission opening. In the specific exemplary embodiment of FIG. 1, the arrangement of the six radiation-reflecting areas leads to the formation of a radiation reflector having a hexagonal outer boundary of the opening. In this case, the radiation-reflecting areas are formed as an equilateral triangle, the radiation-reflecting areas being curved outwards from the center of the radiation reflector.

In order to better illustrate the curvature of the radiation-reflecting areas, FIG. 2 shows a cross section through the radiation reflector 1 along the sectional line A-A represented as a broken line in FIG. 1. At the center of the radiation reflector, a light source L is arranged in each case at the upper radiation-reflecting area 11 and at the lower radiation-reflecting area 14. The radiation-reflecting areas are curved outwards, such that light which is emitted by the light sources laterally, radially in the direction of the radiation-reflecting areas of the radiation reflector 1, experiences a deflection by approximately 90° at the radiation reflector 1 and is directed onto an object O to be backlit, the object being arranged in front of the radiation reflector. The object O can be a display panel, for example, a billboard. However, the object O can also be a display, for example, which is irradiated from behind.

By virtue of the radiation reflector 1 being formed in curved fashion, the light generated by the light sources L is emitted uniformly in the direction of the object O to be backlit. The arrangement of a diffusing film above the reflector is no longer necessary. As a result, it is possible to significantly reduce the required distance between the light source L and the object to be backlit.

FIG. 3 shows an area illustration of one embodiment of radiation reflectors 1 from FIG. 1. By virtue of the emission opening of the radiation reflectors 1 being formed in honeycomb-shaped fashion, a multiplicity of such radiation reflectors can be modularly combined without any gaps to form a large luminous area 100. In this case, the luminous area 100 can be reduced or extended modularly from the individual radiation reflectors 1. The shape of the luminous area 100 can also be adapted flexibly to the object that is to be illuminated or backlit. By means of the radiation reflectors 1, light generated by a light source at the center of the reflector is emitted uniformly from behind onto the object to be backlit. In order to generate a homogeneous illumination, it is thus possible to significantly reduce the required distance between the light source at the center of the radiation reflectors and the object that is to be backlit and is arranged directly in front of the reflector. The structural height h of an illumination device of this type is merely between 10 mm and 15 mm.

Further geometrical shapes of radiation reflectors can be used besides the use of the radiation reflectors 1 formed in honeycomb-shaped fashion that are shown in FIGS. 1 to 3. FIG. 4 shows a radiation reflector 2 comprising a plurality of radiation-reflecting areas 21, 22, 23. The radiation-reflecting areas 21-23 are formed in the shape of circle segments. In this case, the outer circle line can be embodied in round or oval fashion. A radiation reflector shaped in imbricated fashion can be formed by the arrangement of at least two, in the example of FIG. 4 three, radiation-reflecting areas embodied in this way.

Figure 5:
FIG. 5 shows a cross section through an embodiment of a radiation reflector for generating radiation.

FIG. 5 shows a cross section through the embodiment of the radiation reflector 2 shown in FIG. 4, along the sectional line depicted as a broken line designated by A-A. In this case, the radiation-reflecting areas curve outwards from a center, of the reflector formed in imbricated fashion, at which the light source L is arranged. Preferably, a light source having an emission direction directed in the direction of one of the radiation-reflecting areas 21-23 of the radiation reflector 2 is arranged at the center of the radiation reflector 2. By virtue of the curvature of the reflector, the light generated by the light source is deflected at the reflector screen and directed in the direction of an object in front of the radiation reflector 2. On account of the small curvature of the radiation-reflecting areas 21-23, it is possible, in the embodiment of the radiation reflector 2 that is shown in FIGS. 4 and 5, too, to construct a luminous area 200 formed from a multiplicity of radiation reflectors 2 of this type and having a small structural height.

Figure 6:
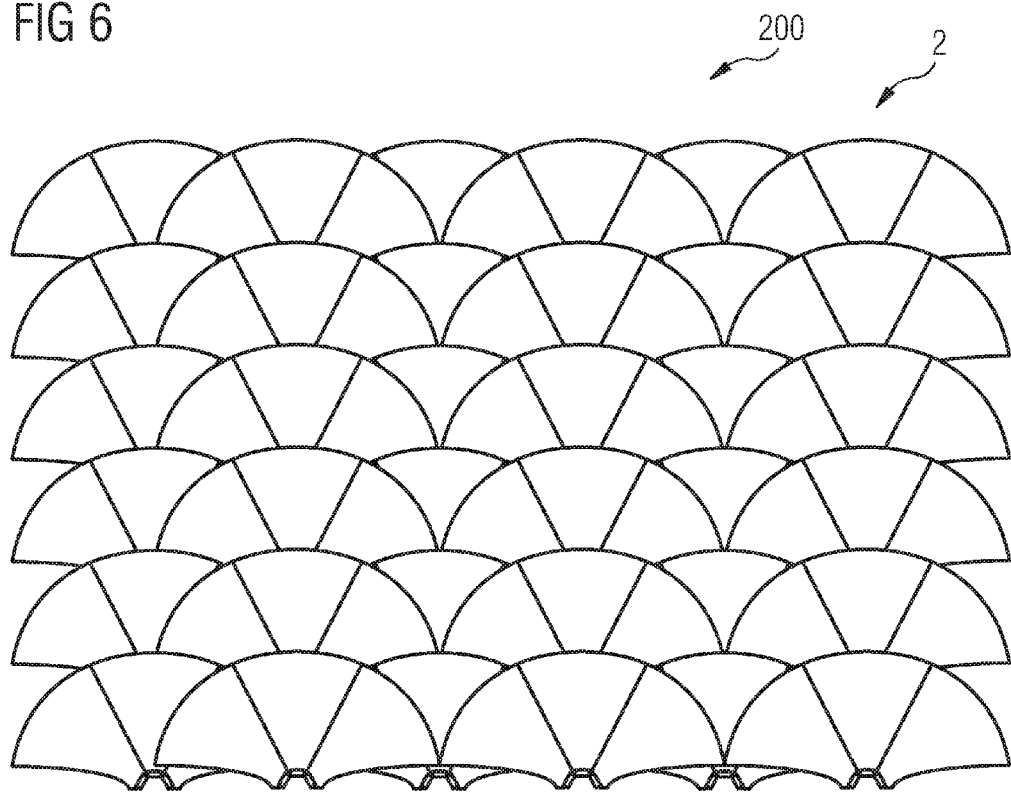
FIG. 6 shows an embodiment of a luminous area for generating radiation.

FIG. 6 shows an area illustration of a luminous area 200 comprising a multiplicity of the radiation reflectors 2 shown in FIG. 4. In this case, the radiation reflectors, which are arranged in a respective row, are arranged in two rows one behind another and therefore overlap. This gives rise to a luminous area with an imbricated arrangement of radiation reflectors.

Figure 7:
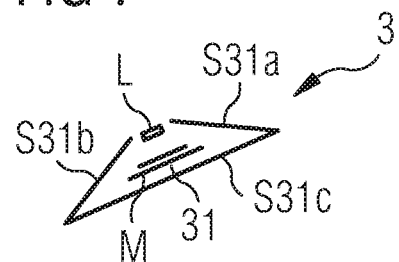
FIG. 7 shows an embodiment of a radiation-reflecting area of a radiation reflector for generating radiation.

FIG. 7 shows a further embodiment of a radiation-reflecting area 31 of a radiation reflector 3. Arranged at an edge region of the radiation-reflecting area 31 is a light source L, preferably a light-emitting diode, with a radiation directed onto the radiation-reflecting area 31. The radiation-reflecting area 31 is formed in triangular fashion, the two side areas S31a and S31b being embodied such that they are identical in length but shorter than the base side S31c.

As a result, the radiation-reflecting area 31 has the shape of an isosceles triangle. In a manner similar to that in the embodiments shown in FIGS. 2 and 5, the radiation-reflecting area 31 also has a curvature in the direction of the base side S31c. As a result, light emitted by the light source L in the direction of the radiation-reflecting area 31 is deflected by 90° and emitted in the direction of an object arranged in front of the radiation-reflecting area 31. By arranging three radiation-reflecting areas of this type, which are respectively irradiated by a light source L, it is possible to construct a pyramidal radiation reflector 3.

Figure 8:
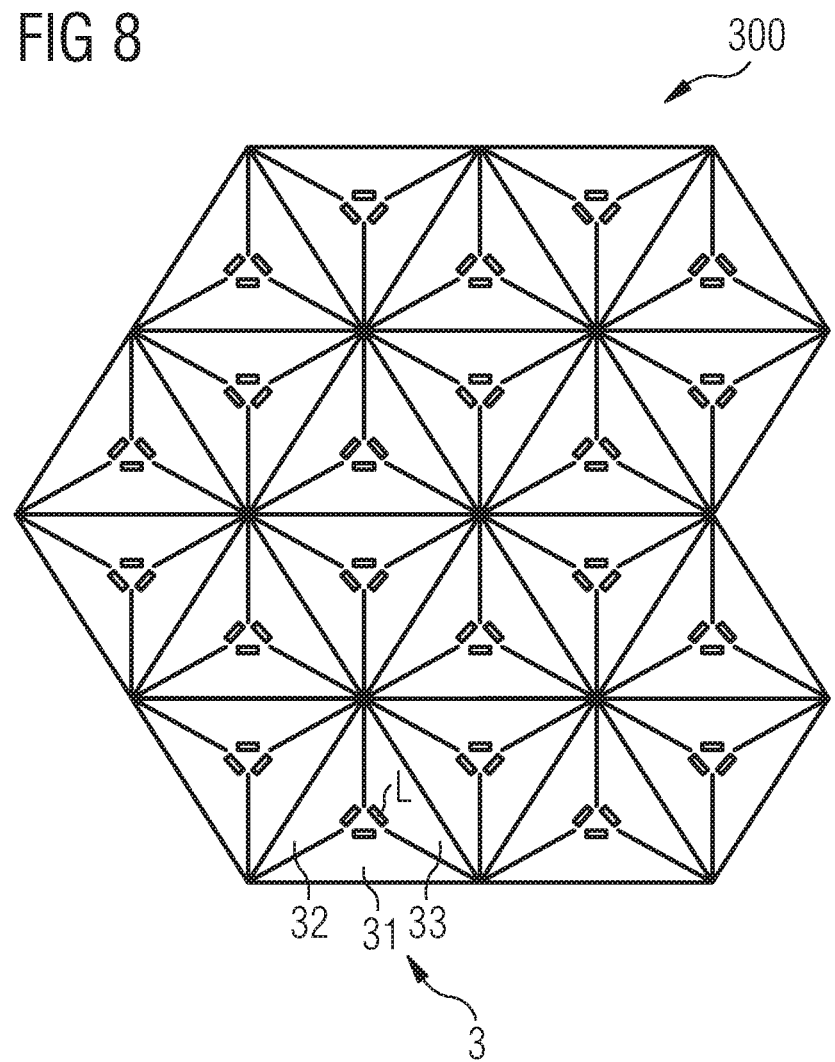
FIG. 8 shows a luminous area with a multiplicity of radiation reflectors for generating radiation.

FIG. 8 shows an area illustration of a luminous area 300 shaped from a multiplicity of radiation reflectors 3 formed in pyramidal fashion. The side areas 31, 32 and 33 of each of the radiation reflectors 3 have the embodiment illustrated in FIG. 7.

FIG. 9 shows a further embodiment of a luminous area 400. The luminous area comprises a plurality of radiation reflectors 4 formed in pyramidal fashion, which are formed in each case from four radiation-reflecting areas 41, 42, 43 and 44. In this case, the radiation-reflecting areas are curved outwards, in a manner similar to that illustrated in FIG. 2, such that light emitted by the light sources L at the center of each of the radiation reflectors experiences a deflection by 90° and is emitted in the direction of an object which is to be backlit and is arranged in front of the luminous area 400.

In the embodiments of a luminous area which are illustrated in FIGS. 3, 6, 8 and 9, a multiplicity of radiation reflectors composed of differently formed radiation-reflecting areas are combined modularly to form the luminous areas illustrated in the figures. The luminous area can be enlarged or reduced as desired by virtue of the modular construction of the luminous area using light box technology. The radiation reflectors can be adhesively bonded, for example, to form a large luminous area. A further possibility for assembly consists in connecting the radiation reflectors by means of brackets that are fitted laterally or on the rear side. It is particularly advantageous if the radiation reflectors or the luminous tiles have standardized shapes, such as, for example, the hexagonal-honeycomb shape, imbricated shape or triangular shape shown in the embodiments specified.

For generating the light emitted by the luminous area, the radiation-reflecting areas are curved outwards from their respective center. In this case, the curvature of the radiation reflectors can be formed in such a way that the embodiments of the luminous areas that are illustrated in FIGS. 3, 5, 8 and 9 have a structural height of much less than 50 mm, preferably within the range of between 10 mm and 15 mm. Consequently, in contrast to a luminous area in which light sources are arranged behind a diffusing film, the structural height in the case of a luminous area formed from radiation reflectors is reduced by approximately a factor of five. Furthermore, the use of the radiation reflectors and the modular construction using light box technology with luminous tiles which are formed in honeycomb-shaped and imbricated fashion and in which a light source is arranged at the center result in a uniform backlighting of an object or a homogeneous illumination of an object to be irradiated.

Furthermore, in contrast to an arrangement of a luminous area in which a multiplicity of light sources are arranged at a distance behind a diffusing film, significantly fewer light sources have to be used in the case of the modular construction of the luminous area to form a homogeneous illumination. The energy consumption of a luminous area of this type is reduced as a result. Since light sources are arranged in each case at the center of a radiation reflector, a uniform light distribution is effected, such that an area is illuminated homogeneously.

Any desired light sources which emit the light that they generate in a directional manner can be used as light sources at the center of the radiation reflectors. For this purpose, the light sources have an optical system, for example, in order to generate radiation in the direction of the reflective areas of the radiation reflectors. Light-emitting diodes with such an optical system are preferably used in this case. The optical system can be integrated in a component housing of the light-emitting diode. By way of example, RGB power side LEDs can be used. "Side LEDs" (side emitting light-emitting diode components) are provided, in particular, for mounting on a carrier such as a circuit board and for emission along a direction parallel to the carrier. "Power LEDs" have a high power consumption, for example, of 1 W or more, in particular of 3 W or more. "RGB LEDs" contain, for example, at least one red-emitting, one green-emitting and one blue-emitting light-emitting diode chip.

Diffusely reflective or directionally reflective layers having a mirror-coated surface are used as materials for the radiation-reflecting areas of the radiation reflectors. In this case, there is the possibility of shaping the surface of the radiation-reflecting areas such that it is as smooth and planar as possible, in order to generate a uniformly homogeneous emission. In addition, however, there is also the possibility of embodying the radiation-reflecting areas in structured fashion.

FIG. 7, for example, shows a radiation-reflecting area 31 having a plurality of grooves M at which the light emitted by the light source L is refracted. Structures of this type can also be realized in the form of steps or edges. When using structured surfaces of the radiation-reflecting areas, the radiation which is otherwise generated homogeneously can be varied in such a way that the radiation reflected by the radiation reflector is emitted inhomogeneously. Radiation patterns, for example, can be generated as a result.

The luminous areas constructed modularly from a multiplicity of radiation-reflecting areas or luminous tiles can be used preferably for backlighting objects, for example, for backlighting billboards, or else for display backlighting. It is also possible to use luminous areas of this type for general lighting purposes.

The invention claimed is:

1. An illumination device for a display panel, comprising:
   a plurality of radiation reflectors, each reflector being irradiated by at least one light source,
   wherein the radiation reflectors are arranged modularly to form a radiation-reflecting luminous area along a first plane for backlighting the display panel; and
   wherein at least two radiation reflectors overlap laterally in places along the first plane, so that one of the at least two radiation reflectors covers over the at least one light source that illuminates the other radiation reflector, when viewed along a direction perpendicular to the first plane of the radiation-reflecting luminous area.

2. The illumination device according to claim 1,
   wherein the at least one light source is arranged at a center of the radiation reflectors,
   wherein the at least one light source is formed in such a way that light generated by the at least one light source is emitted radially in a direction of the radiation reflectors, and
   wherein the radiation reflectors are each shaped in such a way that light reflected at each of the radiation reflectors is reflected in a direction perpendicular to the direction of the light emitted by the at least one light source.

3. The illumination device according to claim 1, wherein each of the radiation reflectors has a plurality of radiation-reflecting areas.

4. The illumination device according to claim 3, wherein the radiation-reflecting areas of each radiation reflector is arranged in a manner curved outwards from the center of the respective radiation reflector.

5. The illumination device according to claim 4, wherein a light source is arranged at the center of each radiation reflector, each of the radiation-reflecting areas of each radiation reflector being irradiated by one of the at least one light sources.

6. The illumination device according to claim 3, wherein the radiation-reflecting areas of the radiation reflectors are formed in triangular fashion.

7. The illumination device according to claim 3, wherein a peripheral line of the radiation-reflecting areas of the radiation reflectors is formed as an equilateral triangle.

8. The illumination device according to claim 3, wherein the radiation-reflecting areas of the radiation reflectors are formed in the form of a circle segment.

9. The illumination device according to claim 8, wherein each of the radiation reflectors comprises at least two radiation-reflecting areas.

10. The illumination device according to claim 8, wherein the radiation reflectors are arranged in at least two rows that are offset with respect to one another to form the radiation-reflecting luminous area.

11. The illumination device according to claim 3, wherein a surface of each radiation-reflecting area is formed in structured fashion.

12. The illumination device according to claim 11, wherein the surface of each radiation-reflecting area has a groove, a step or an edge structure.

13. The illumination device according to claim 1, wherein the radiation reflectors are arranged in a honeycomb pattern.

14. The illumination device according to claim 13, wherein each radiation reflector includes a hexagonal opening from which reflected light emerges.

15. The illumination device according to claim 1, wherein the at least two radiation reflectors overlap in imbricated fashion.

16. The illumination device according to claim 1, wherein each radiation reflector includes a triangular opening from which reflected light emerges.

17. The illumination device according to claim 1, wherein each radiation reflector includes a rectangular opening from which reflected light emerges.

18. The illumination device according to claim 16, wherein each of the radiation reflectors is formed in pyramidal fashion.

19. The illumination device according to claim 1, wherein the at least one light source comprises a light-emitting diode.

20. The illumination device according to claim 19, wherein the light-emitting diode has a directional emission in a direction of the radiation reflector.

21. The illumination device according to claim 1, wherein the radiation reflectors are combined to form the radiation-reflecting luminous area by means of brackets.

22. The illumination device according to claim 1, further comprising at least one display object arranged in front of the radiation-reflecting luminous area.

23. The illumination device of claim 1, wherein light which is emitted by the at least one light source does not travel on a straight line along the direction perpendicular to the first plane of the radiation-reflecting luminous area to an object to be illuminated or to be backlit by the illumination device.

24. The illumination device of claim 1, wherein light which is emitted by the at least one light source and travelling along the direction perpendicular to the first plane of the radiation-reflecting luminous area to an object to be illuminated or to be backlit by the illumination device has been reflected at least once.

25. A method of illuminating an object, the method comprising:
providing an illumination device comprising a plurality of radiation reflectors that are each irradiated by a respective light source, wherein the radiation reflectors are arranged modularly to form a radiation-reflecting luminous area extending along a first plane;
generating light from light sources to irradiate the radiation reflectors; and
reflecting the light off of the radiation-reflecting luminous area in a first direction substantially perpendicular to the first plane and toward the object so as to illuminate the object;
wherein at least two radiation reflectors overlap laterally in places along the first plane; and
wherein one of the at least two radiation reflectors covers over the respective light source that illuminates the other radiation reflector, when viewed along the first direction; and
wherein reflecting the light comprises backlighting a display panel or backlighting a display.

26. The method according to claim 25, wherein the illumination device is spaced from the object by a distance of less than 50 mm.

27. The method according to claim 25, wherein no light is directly emitted towards the object.

28. A display apparatus comprising:
an illumination device comprising a plurality of radiation reflectors that are each irradiated by a respective light source, wherein the radiation reflectors are arranged modularly to form a radiation-reflecting luminous area, wherein at least two radiation reflectors overlap laterally in places along the radiation-reflecting luminous area and wherein one of the at least two radiation reflectors covers over the respective light source that illuminates the other radiation reflector when viewed along a direction perpendicular to the radiation-reflecting luminous area; and
a display or display panel adjacent the illumination device.

29. The apparatus according to claim 28, wherein the apparatus has a structural height of less than or equal to 50 mm.

* * * * *